United States Patent
Schuerman

[11] Patent Number: 5,971,242
[45] Date of Patent: Oct. 26, 1999

[54] VEHICLE ACCESSORY HOLDER

[76] Inventor: Linda J. Schuerman, 5110 N. 32nd St., #126, Phoenix, Ariz. 85018

[21] Appl. No.: 08/939,927

[22] Filed: Sep. 29, 1997

[51] Int. Cl.$^6$ ...................................................... B60R 11/00
[52] U.S. Cl. ............................................ 224/544; 224/539
[58] Field of Search ..................................... 224/544, 539, 224/543, 235, 197, 199, 255, 664, 650, 680

[56] References Cited

U.S. PATENT DOCUMENTS

| | | |
|---|---|---|
| D. 284,372 | 6/1986 | Carpenter . |
| D. 329,750 | 9/1992 | Gilmore . |
| D. 377,117 | 1/1997 | Klassen . |
| 2,971,688 | 2/1961 | Akers . |
| 3,033,362 | 5/1962 | Marcalus ................................ 224/539 |
| 3,201,018 | 8/1965 | Moody . |
| 3,425,539 | 2/1969 | Mach ...................................... 224/543 |
| 4,724,986 | 2/1988 | Kahn . |
| 4,877,164 | 10/1989 | Baucom . |
| 5,048,733 | 9/1991 | Nagy . |
| 5,086,958 | 2/1992 | Nagy . |
| 5,179,590 | 1/1993 | Wang . |
| 5,246,190 | 9/1993 | Swerkal . |
| 5,730,340 | 3/1998 | Bosic ...................................... 224/664 |

Primary Examiner—David J. Walczak
Attorney, Agent, or Firm—Tod R. Nissle, P.C.

[57] ABSTRACT

A vehicle accessory holder is adapted to fit on an adapter plug. The plug has a receiving end and a projecting end. The projecting end has a wider diameter than the receiving end. The vehicle accessory holder is shaped to slidably removably fit over the receiving end but cannot fit over the projecting end.

4 Claims, 8 Drawing Sheets

VEHICLE ACCESSORY HOLDER

FIELD OF THE INVENTION

The present invention relates to the field of devices used in motor vehicles to hold or contain accessories such as cellular telephones, sunglasses or the like. More particularly, the present invention relates to accessory containers that removably attach to the interior of the motor vehicle.

BACKGROUND OF THE INVENTION

Operators of vehicles such as cars, trucks, or the like, frequently have a variety of small devices or accessories that they use while driving the vehicle. Specific examples are cellular telephones, sunglasses, pagers or the like. Additionally, a variety of small items, e.g., coins, keys, pass cards, writing instruments or the like are frequently unconfined in the passenger volume.

Most, if not all, motor vehicle interiors are particularly unsuited for accommodating small to mid-sized items used while in the vehicle. Generally no flat, level surface exists within convenient arms reach of the driver or front seat passenger that will accommodate the various types of devices in common usage.

In some vehicles, the top surface of the dashboard is flat and nearly level enough to support some devices, but the inward slant of the windshield prevents placement of most devices. Those vehicle dashboard tops that are able to accommodate devices do not provide a stabilizing structure for the devices, resulting in the device falling off the dashboard upon vehicle acceleration or sliding to one side or the other when the vehicle rounds a turn. The sliding of the device is highly likely to cause it to fall from the dashboard. A driver may instinctively react to prevent the device from falling thus removing the driver's attention from safe vehicle operation.

Although some motor vehicles have a flat console area between split front seats that can accommodate devices, these consoles do not prevent the devices from sliding around, again possibly distracting the driver's attention from safe vehicle operation. Moreover, the location of these consoles is often inconvenient for easy access by the vehicle driver.

Previously, motor vehicles have included small recesses designed to hold very small items such as coins or pens. However, these small recesses are insufficient for larger items such as sunglasses and cellular telephones.

DESCRIPTION OF THE PRIOR ART

Some prior art devices have attempted to overcome these problems but with limited success. For example, U.S. Pat. Nos. 5,179,590 to Wang, 5,048,733 to Nagy, 5,086,958 to Nagy, and 4,877,164 to Baucom, all disclose devices or accessories that plug into accessory outlets of motor vehicles. All of these devices include complicated and cumbersome holders or adapters that project well away from the dash and when in use place large stresses and strains on the accessory outlets. Moreover, the holders and adapters of these devices typically hold specific items and are not generally adaptable for alternative items. Furthermore, the accessory outlet must be horizontal for these devices to be of any use and they often place the held items into positions that interfere with other components of the vehicle, such as the radio or the ashtray, or the like.

U.S. Pat. Nos. 2,971,688 to Akers, and 5,246,190 to Swerkal disclose bags or boxes that attach in some manner to the dash of a motor vehicle. The Akers '688 device is a fold-out trash box that is discarded once the trash box is full. The Akers '688 device includes a tab-forming cut in an extension of a rear wall of the trash box. The tab-forming cut possibly takes advantage of a conveniently located knob on a dash or instrument panel to suspend the trash box. Nothing prevents the tab-forming cut from slipping off the knob and spilling the contents of the trash box.

Alternately, the trash box is removably hung from a wall or other surface by a weak adhesive coating that is applied to an external surface of the rear wall of the trash box. Such adhesives can damage the dash or other interior surfaces of the motor vehicle.

The Swerkal '190 device is a glove box mounted clip that is designed to hold plastic trash bags, such as those bags in common use by grocery stores. The Swerkal '190 device requires closing the glove box unnaturally over a formed strip of metal that holds the plastic bag. Additionally, the plastic bag is not within easy reach of the driver.

Moreover, the above devices and disclosures are not suitable for items that are in frequent use by the driver or passenger of the motor vehicle. Several types of accessory holders have been proposed, but, nevertheless, all the before known accessory holders suffer from numerous disadvantages, including:

a) the holders do not place the contained items within easy reach of the driver;

b) the design and manufacture of the holders is cumbersome and complicated;

c) the holders are designed to hold specific items such as cups or trash and are not adaptable for items in frequent use by the driver, such as cellular telephones and sunglasses, pass cards, coins, and the like;

d) adhesives or mounting clips used to mount holders cause damage;

e) holders inserted into accessory outlets that project well away from the dash place undue stresses and strains on the outlet and often interfere with use of other components of the dash, such as the radio, climate controls, ashtrays, or the like;

f) holders that insert into accessory outlets require horizontal positioning of the accessory outlets;

g) holders utilizing knobs or protrusions to suspend the containers do not prevent the device from slipping off the knobs or protrusions; and h) holders are not adaptable for use independent from the motor vehicle.

SUMMARY OF THE INVENTION

Accordingly, several objects and advantages of the present invention are:

a) to provide an easily accessible device removably mountable to the interior of the motor vehicle and adapted to contain a variety of different items;

b) to provide an easily accessible device adapted to contain a variety of different items frequently used by the driver or passenger, such as cellular telephones, sunglasses, pass cards, coins, and the like, the device further including a ring or aperture which is received by a projection or protrusion and from which the device depends;

c) to provide a removably mountable device that works in combination with the power plug or recharge plug purchased for use with accessories, or a cigarette lighter plug included with the motor vehicle;

d) to provide a removably mountable device that further includes an adapter plug that is capable of insertion into an accessory outlet of a motor vehicle, the adapter plug being designed to support the removably mountable device and prevent the device from slipping off the adapter plug;

e) to provide an adapter plug for use with a removably mountable device that attaches to the interior of motor vehicles, the adapter plug further includes a projecting end that is wider than the end of the plug received by the accessory outlet, the projecting end further being wider than the ring or aperture from which the device depends.

f) to provide a device that is simple and economical to produce and use;

g) to provide a removably mountable device that does not damage a vehicle's interior surfaces;

h) to provide a removably mountable device that does not interfere with use of other components, such as the radio, climate control, ashtrays, or the like;

i) to provide a removably mountable device that is adapted to be used with any accessory outlet, knob, or protrusion located in a motor vehicle interior and is adapted to contain a variety of different items used by passengers or drivers;

j) to provide a removably mountable device that is convertible to a belt or strap mounted device for optionally transporting the items outside the vehicle and is adapted to contain a variety of different items.

Further objects and advantages of the invention will become apparent from a consideration of the drawings and ensuing description.

DESCRIPTION OF THE DRAWINGS

The novel features considered characteristics of the invention are set forth with particularity in the appended claims. The invention itself, however, both as to its structure and its operation together with the additional objects and advantages thereof will best be understood from the following description of the preferred embodiment of the present invention when read in conjunction with the accompanying drawings wherein.

b) is a second form of the adapter plug according to the present invention;

c) is a third form of the adapter plug according to the present invention;

d) is a fourth form of the adapter plug according to the present invention;

e) is a fifth form of the adapter plug according to the present invention;

f) is a sixth form of the adapter plug according to the present invention;

g) is a seventh form of the adapter plug according to the present invention; and h) is an eighth form of the adapter plug according to the present invention.

DESCRIPTION OF THE PREFERRED EMBODIMENTS

With reference now to the drawings, and in particular to FIGS. 1 through 10h), a new and improved device configured to be mountable, preferably removably, to the interior of a motor vehicle and adapted and useful to contain a variety of different items is described below. The device is further adapted to attach to a belt or strap for use independent of the motor vehicle.

Figure 1:
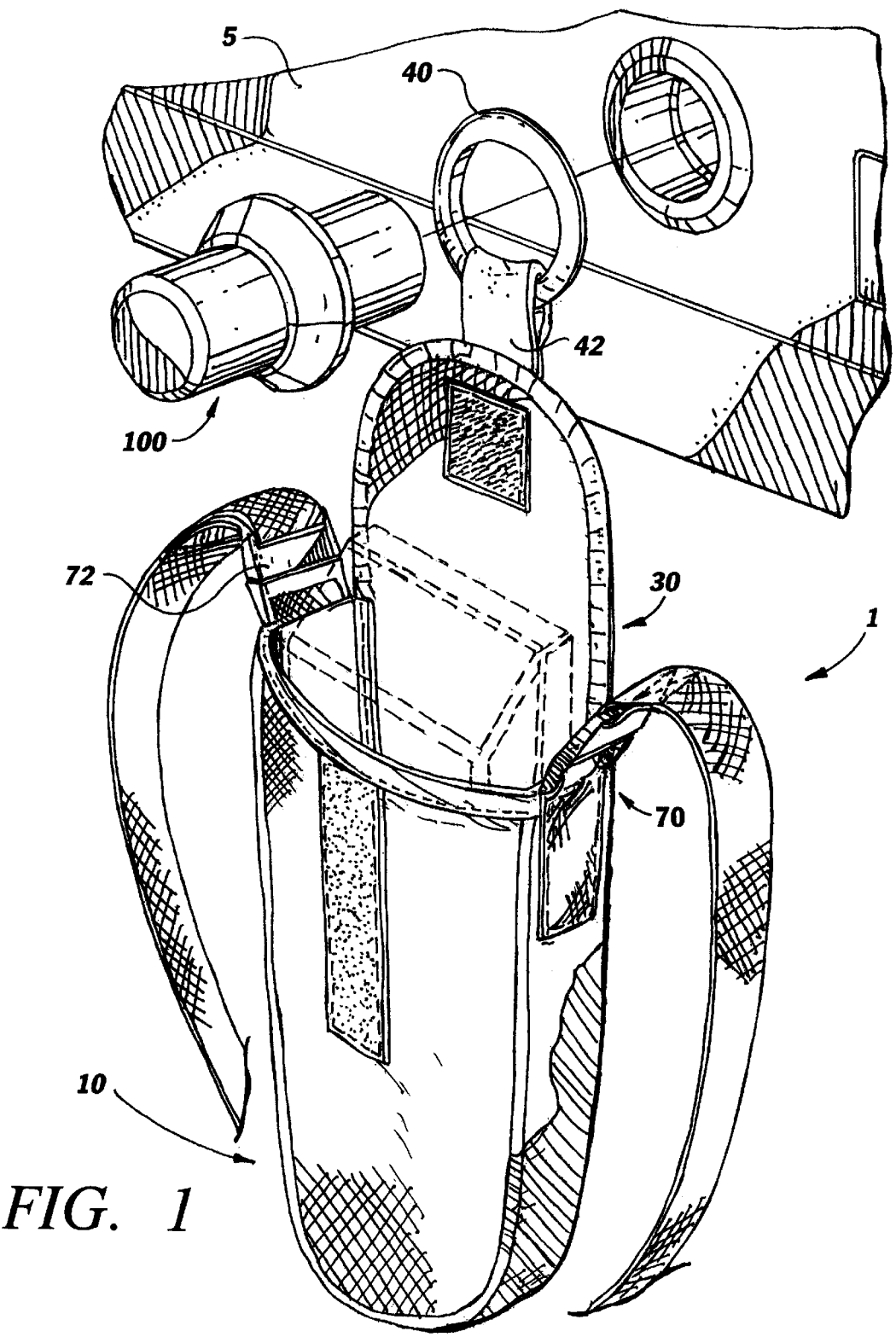
FIG. 1 is a general perspective view of an embodiment of the present invention, as used with an accessory outlet of a motor vehicle.

One embodiment of the present invention is illustrated in FIG. 1, which illustrates how a device 1, which is adapted to hold a variety of different items, is removably mountable to a motor vehicle dash 5. In FIG. 1, the device 1 is secured to the dash 5 by an adapter plug 100, which is the preferred form of securement. The device 1 has a lower structure 10 which is adapted to contain a variety of different items, either individually or in combination and is mountable to the interior of the motor vehicle by an attachment structure 30.

Preferably, the lower structure 10 is constructed of a front section 12 attached through an intervening side wall 16 to a back section 14. As in FIG. 1, the front section 12 and back section 14 are preferably substantially rectangular in shape, however, they may take any shape or form suitable to contain items or articles and still fall within the scope of the present invention. Side wall 16 is attached to and extends between two side edges 18 and a bottom edge 20 of the front section 12 and the back section 14, respectively. While the lower structure 10 may be manufactured or formed into an integral unit, preferably the side wall 16 attaches to the two side edges 18 and bottom edge 20 of the front and back sections, 12 and 14, by methods well known in the art, such as sewing, gluing, thermal fusion, and the like. Alternatively, the two side edges 18 and bottom edge 20 of the front and back sections, 12 and 14, may attach directly to each other without the intervention of side wall 16. A containing pocket or envelope is thus formed that is capable of containing a variety of different items, e.g., cellular telephones, sunglasses, pictures, key cards, pagers, and the like. The material from which the lower structure 10 is manufactured may be flexible, expandable, or rigid, but is preferably flexible. Furthermore, the material may be opaque or it may be transparent to allow viewing of the contents of the lower structure 10.

Figure 4:
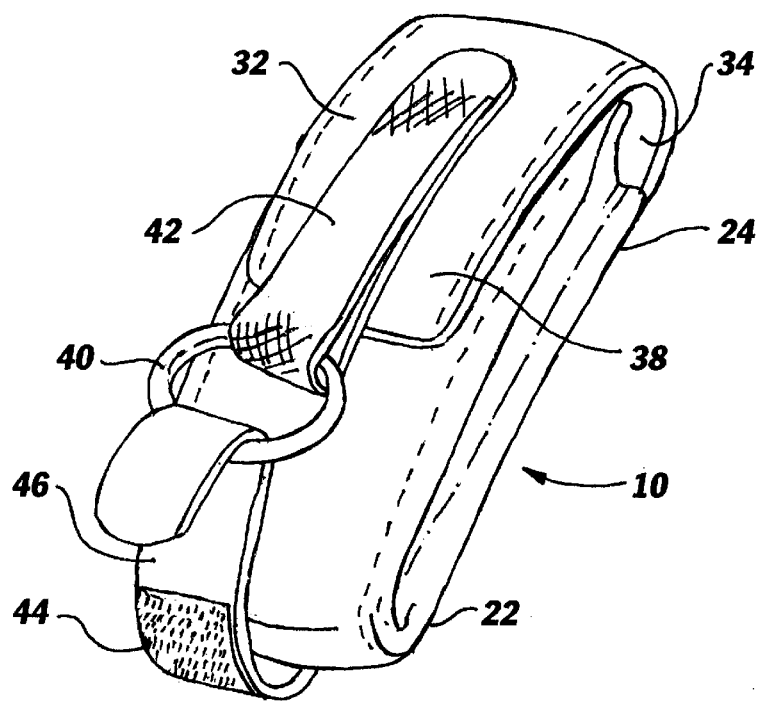
FIG. 4 depicts an alternate securing structure for a flap of the present invention.

The lower structure 10 is removably securable to surfaces through an attachment structure 30 that is attached to the lower structure 10. The attachment structure 30 in the preferred embodiment is a flap 32 that is attached at a first end 34 to an upper portion 24 of the lower structure 10. A second end 38 of flap 32 has a ring 40 that is secured to the flap 32 by a strap 42 that is looped through the ring 40 and secured back onto itself.. The flap 32 of the attachment structure 30 is useful to provide a covering structure for the containing pocket formed by the lower structure 10 and is fastenable to an external surface of the front section 12. Flap 32 is fastenable to the lower structure 10 by a fastening structure 44 such as those commonly found in the art, including hook and loop fasteners, or, as illustrated in FIG. 4, an additional strap 46 attached to a lower portion 22 of the lower structure 10 may be used to fasten the flap 32 by looping an unattached end of the additional strap 46 through the ring 40 and further self-fastening by a hook and loop fastener.

Although the preferred form of the attachment structure 30 includes flap 32, it is not a critical limitation. For example, another form of the attachment structure is to provide a simple strap attached at one end to an upper portion 24 of the lower structure 10 and attached to the ring 40 at another end. Moreover, the shape or form of the ring 40 is not a critical limitation. However, it is critical that an aperture or orifice is included in the device 1 and is adapted to receive projections or protrusions.

Figure 2:
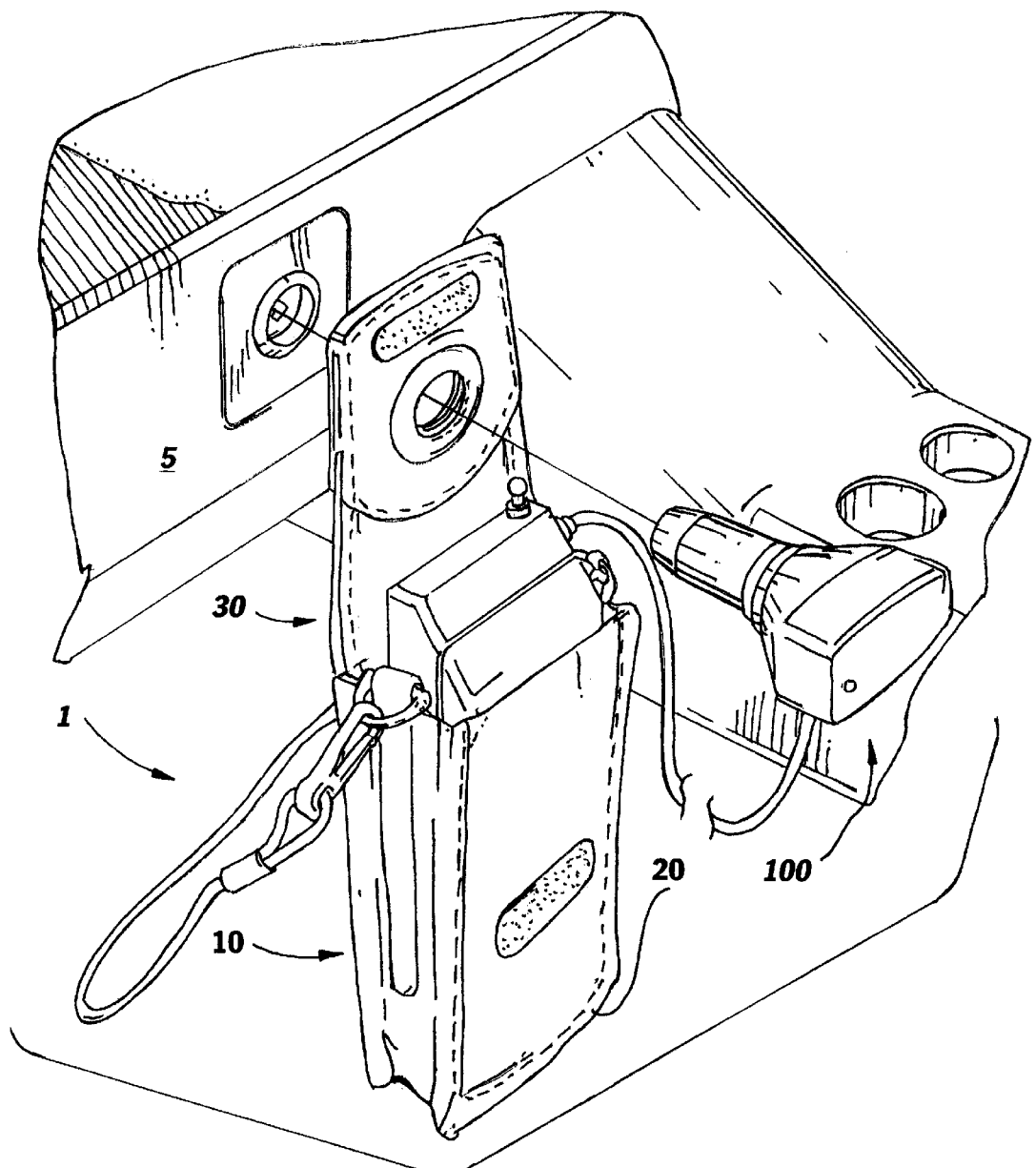
FIG. 2 is a general perspective view of another embodiment of the present invention, as used with the accessory outlet of a motor vehicle.
Figure 3:
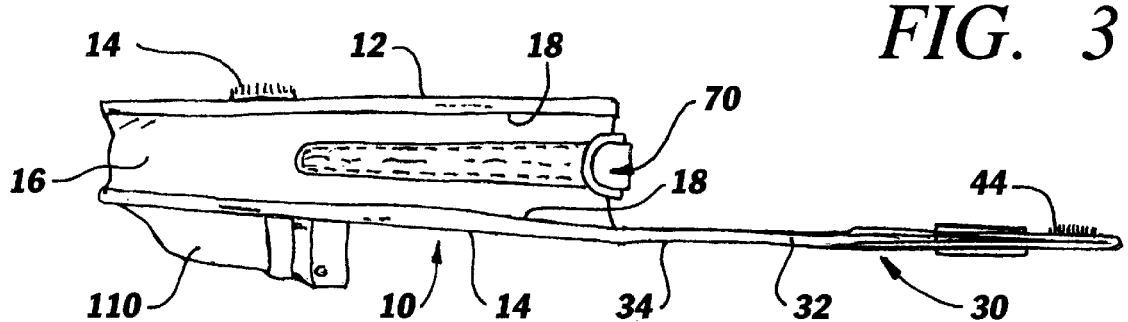
FIG. 3 is a partial view of a side of the an embodiment of the present invention.
Figure 5:
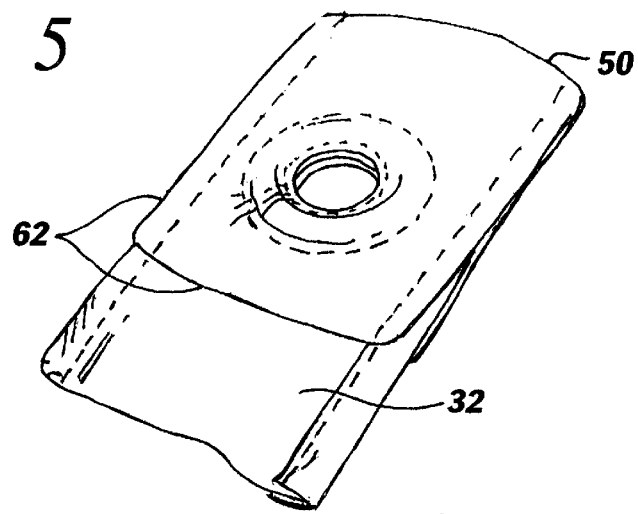
FIG. 5 depicts one method for manufacturing the distal end of the flap of the present invention.
Figure 6:
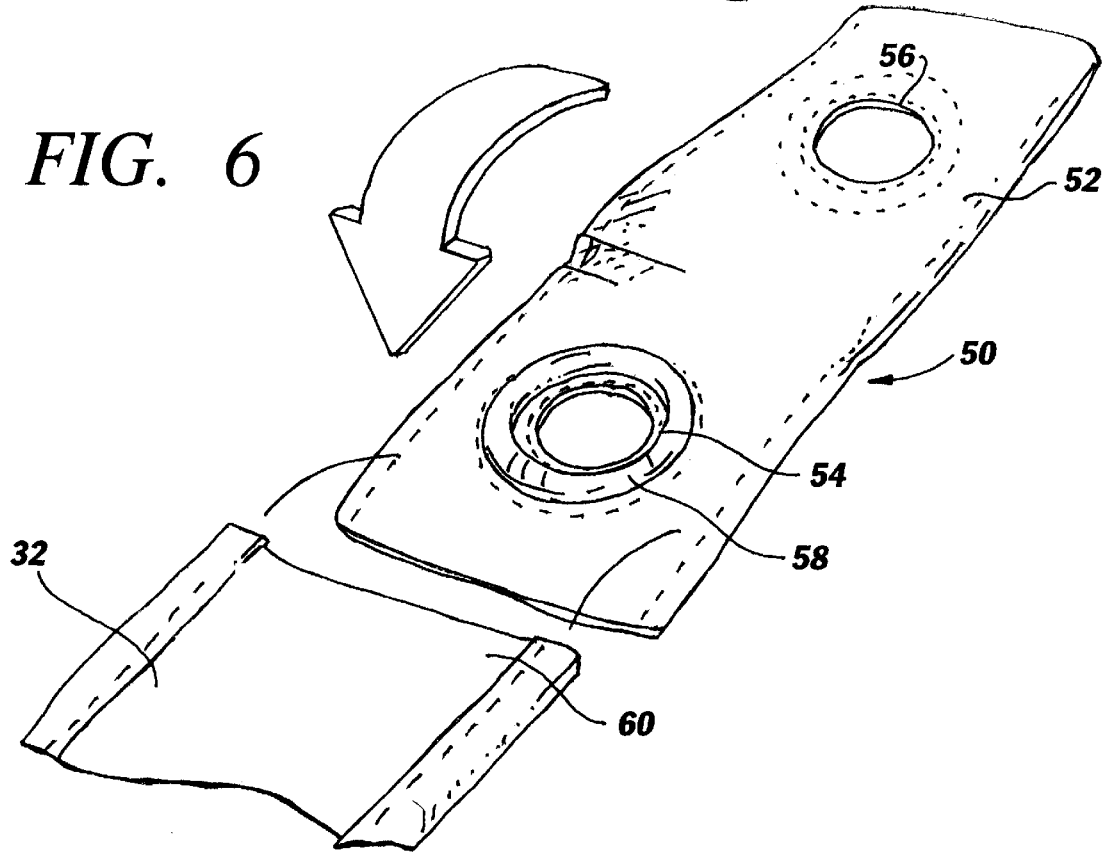
FIG. 6 more clearly illustrates the distal end of the flap of the present invention.
Figure 7:
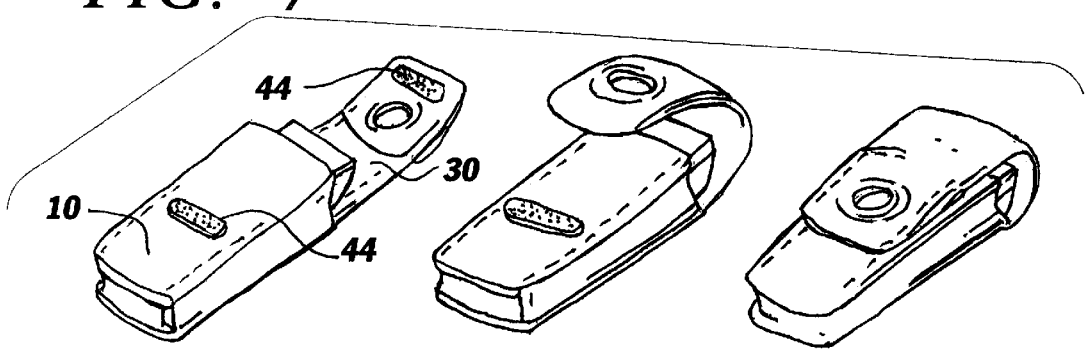
FIG. 7 illustrates how an embodiment of the present invention secures a contained item.

Yet another embodiment of the attachment structure 30, illustrated in FIGS. 2, 5, and 6, is to form the flap 32 as an extension of back section 14 and attach an aperture structure 50. The aperture structure 50 is a piece of material 52, or the like, with first and second holes 54 and 56 extending therethrough, one hole at each end of the material 52, respectively. A rigid structure, such as a ring, 58 is placed over the first hole 54, the material 52 is then folded over the rigid ring 58 until the second hole 56 is aligned with the first hole 54. The ring 58 is then secured into place by sewing or like methods. The aperture structure 50 is then placed over the distal end 60 of the flap 32 and edges 62 of the material 52 are secured together and to the distal end 60 of the flap 32.

Additionally, the lower structure may include two strap attachment structures 70. The two strap attachment structures 70 are located on either side of the lower structure 10, near the attachment structure 30. The two strap attachment structures 70 have securing structures 72 such as D-shaped rings or, preferably, releasable locking buckles. The two strap attachment structures 70 are sewn or otherwise attached to the lower structure 10, such as to the side walls 16, and are reinforced to support weight. Belts or straps may be attached to the securing structures 72, which allow the device 1 to be used independently from the motor vehicle. A belt loop (not shown) may also be included to allow the device 1 to be secured to an individual's waist belt, purse, or bag strap when used independently from the motor vehicle.

Figure 10A:
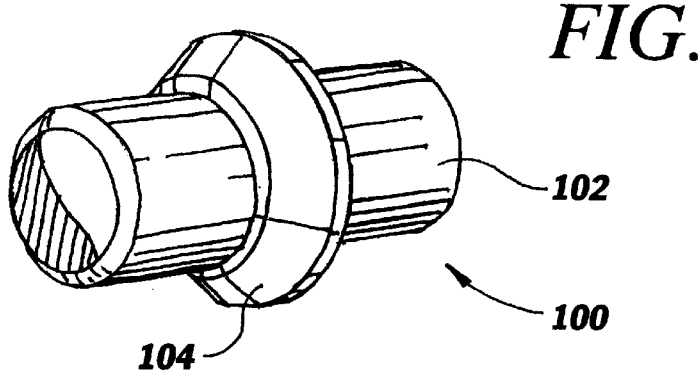
FIG. 10 a) is the preferred form of the adapter plug according to the present invention.
Figure 10B:
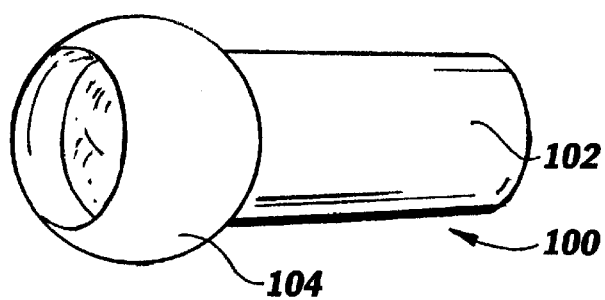
Figure 10C:
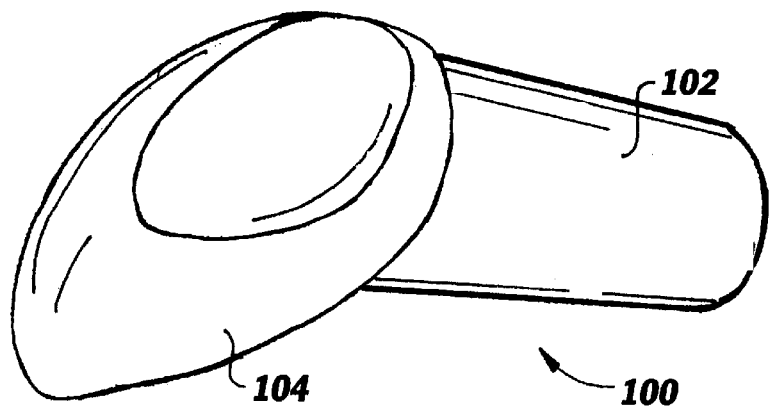
Figure 10D:
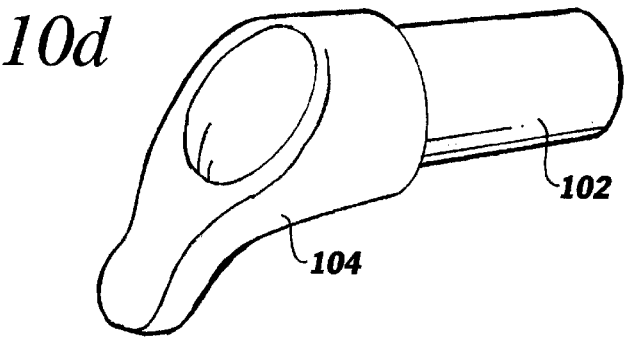
Figure 10E:
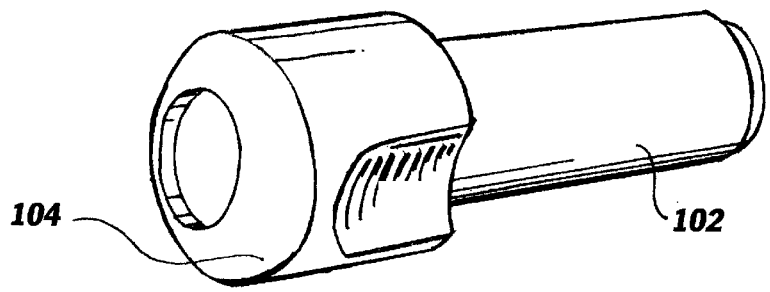
Figure 10F:
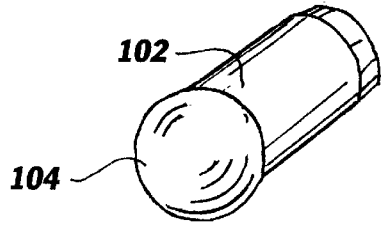
Figure 10G:
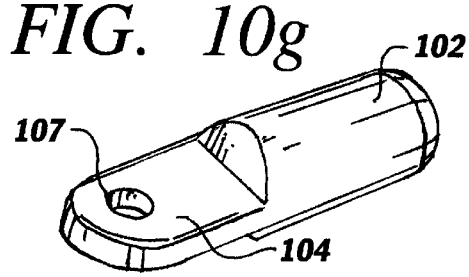
Figure 10H:
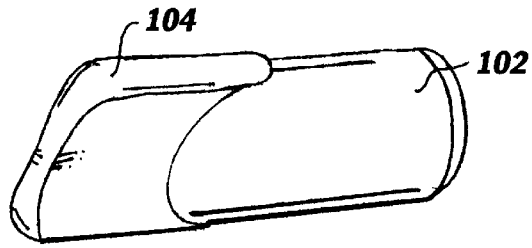

The aperture defined by rings 40 or 58 is adapted to receive projections or protrusions commonly found on the interior of the motor vehicle. A favored received projection is a cigarette plug from an accessory outlet. Preferably, an adapter plug 100 is received by the aperture and used with the accessory outlet of the motor vehicle. FIGS. 10*a*) through *h*) clearly illustrate a wide variety of different forms that the adapter plug 100 may take and still fall within the present invention. The most preferred form of adapter plug 100 has a receiving end 102, adapted to fit into and be received by the accessory outlet, and a projecting end 104 that has a larger diameter than the receiving end 102. In this form, the receiving end 102 is directed through the aperture of the rings 40 or 58 and into the accessory outlet. The wider projecting portion 104, which is also has a larger diameter than rings 40 or 58, holds the device 1 close to the dash 5 thereby reducing unnecessary strains on the outlet. Furthermore, the wider projecting end 104 prevents the device 1 from sliding or falling off the plug adapter 100 during travel. While a wider projecting end 104 of the adapter plug 100 is not a critical element of the present invention, the plug adapter 100 necessarily must be easily insertable and removable from the accessory outlet. Alternately, when the device 1 contains a cellular telephone, as shown in FIG. 2, the aperture 54 or ring 60 of the present invention may receive a battery recharger or power plug that fits into the accessory outlet of a motor vehicle and is typically purchased with the cellular telephone.

Figure 8:
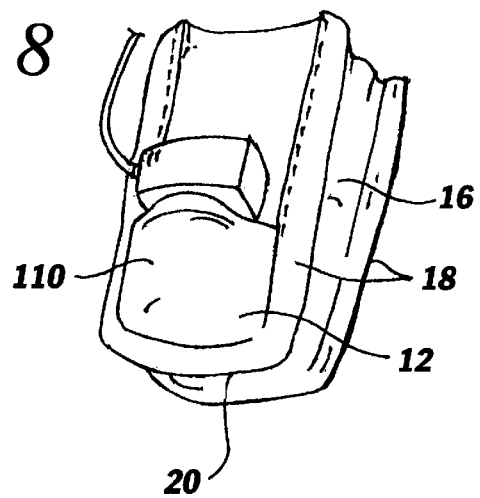
FIG. 8 is a partial perspective view of the lower portion of an embodiment of the present invention.
Figure 9:
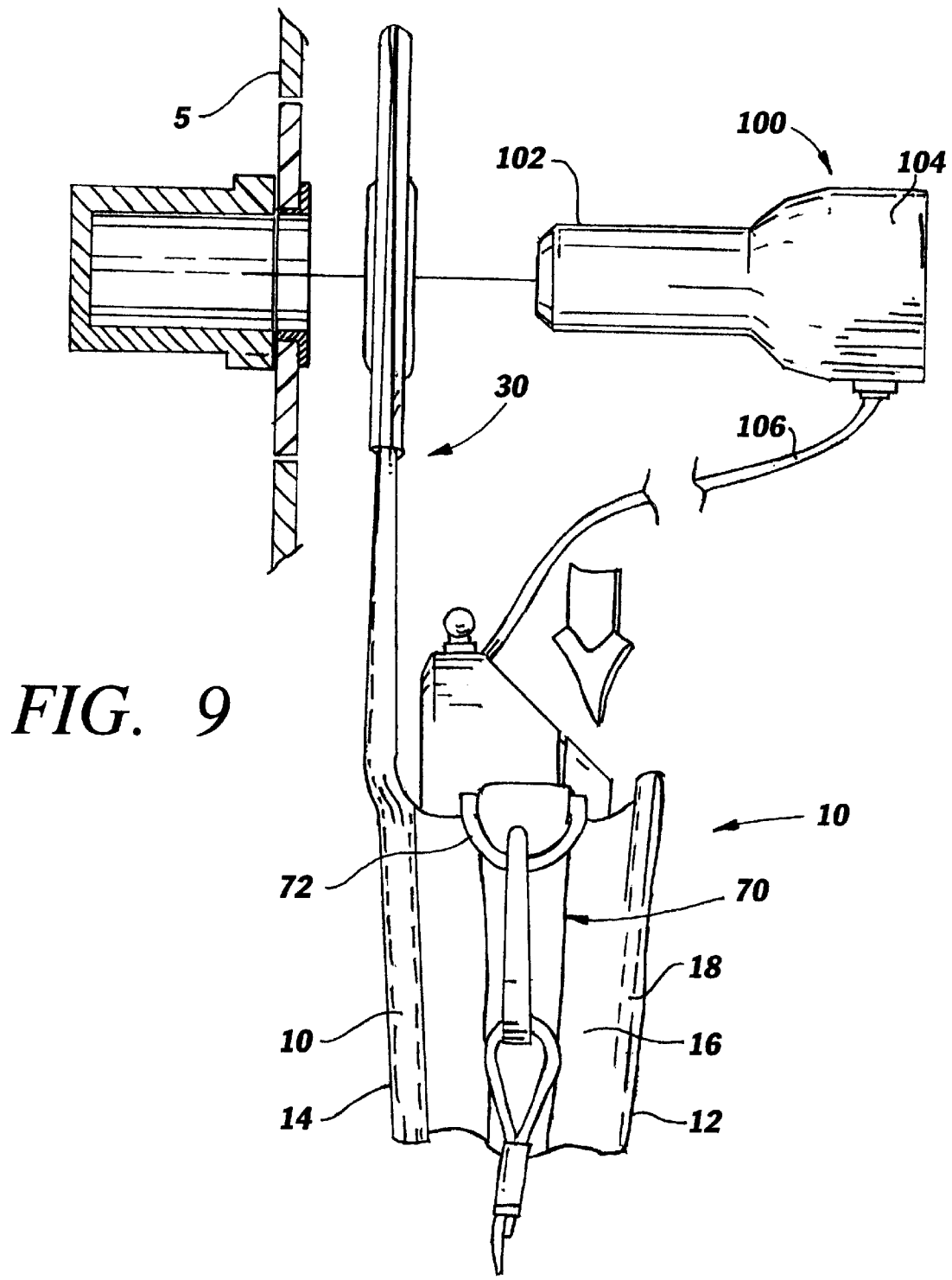
FIG. 9 is a side illustration depicting how adapter plugs function to secure the present invention to an accessory outlet of a motor vehicle.

Finally, a cable or cord 106 may be included to secure the plug adapter 100 to the device 1. The cord 106 is secured to the adapter plug 100 through a small aperture 107, as exampled in FIG. 10*g*). Moreover, as shown in FIG. 8, a pocket 110 may be included in the device 1 to hold or store the plug adapter 100, cards, or the like.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A device for containing items comprising:
   a containment member including a lower structure and adapted to contain a variety of different items;
   an attachment structure attached to the containment member and having a flap means and an aperture formed through the flap means; and
   an adapter plug removably extending through the aperture and sized to be received by an accessory outlet of a motor vehicle to removably secure the containment structure and the attachment structure to a surface on the motor vehicle, the adapter plug including a projecting end and a receiving end, the projecting end having a wider diameter than the receiving end.

2. In combination with an electrical accessory outlet in the interior of a motor vehicle, the improvements comprising removable storage means for securing, electrically charging, and utilizing a communications device in the motor vehicle, said removable storage means including
   (a) telephone means;
   (b) storage means including
      (i) a containment member including a lower structure and containing said telephone means,
      (ii) an attachment structure attached to said containment member and having an aperture formed therethrough;
   (c) adapter means supporting said storage means and said telephone means in said storage means and including
      (i) a first end passing removably through said aperture and removably engaging the electrical accessory outlet in the motor vehicle, and
      (ii) a second end spaced apart from said first end and said electrical accessory outlet and shaped and dimensioned to prevent said aperture from passing over said second end; and,
   (d) an electrical cord interconnecting said adapter means and said telephone means to carry electrical power from said adapter means to said telephone means.

3. In combination with a surface of a motor vehicle, the improvements comprising removable storage means for securing and utilizing a device in the interior of the motor vehicle, said removable storage means including
  (a) an article;
  (b) storage means including
    (i) a structure removably containing said article,
    (ii) an attachment structure having an aperture formed therethrough;
  (c) an adapter supporting said storage means and said article in said storage means and including
    (i) a first end removably passing through said aperture and removably engaging the surface of the motor vehicle, and
    (ii) a second end spaced apart from said first end and said surface and shaped and dimensioned to prevent said aperture from passing over said second end.

4. In combination with at least one socket in a surface of a motor vehicle, the improvements comprising removable storage means for securing and utilizing a device in the interior of the motor vehicle, said removable storage means including (a) an article;
  (b) storage means including
    (i) a containment member including a lower structure and removably containing said article,
    (ii) an attachment structure attached to said containment member and having an aperture formed therethrough;
  (c) adapter means to support said storage means and said article and including
    (i) a first end passing through said aperture and at least partially extending into the socket to engage removably the socket, and
    (ii) a second end spaced apart from said first end and said socket and shaped and dimensioned to prevent said aperture from passing over said second end.

\* \* \* \* \*